United States Patent
Fukagawa et al.

(10) Patent No.: US 6,777,362 B2
(45) Date of Patent: Aug. 17, 2004

(54) MICROWAVE DIELECTRIC CERAMIC COMPOSITION

(75) Inventors: Tomoki Fukagawa, Amagasaki (JP); Kazuhiro Nishikawa, Nagaokakyo (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 10/239,305

(22) PCT Filed: Apr. 25, 2001

(86) PCT No.: PCT/JP01/03588
§ 371 (c)(1),
(2), (4) Date: Oct. 21, 2002

(87) PCT Pub. No.: WO02/059058
PCT Pub. Date: Aug. 1, 2002

(65) Prior Publication Data
US 2003/0100437 A1 May 29, 2003

(30) Foreign Application Priority Data
Jan. 24, 2001 (JP) ........................................ 2001-015566

(51) Int. Cl.$^7$ .......................... C04B 35/465; C04B 35/47
(52) U.S. Cl. ........................................................ 501/136
(58) Field of Search ......................................... 501/136

(56) References Cited

U.S. PATENT DOCUMENTS

| | | | | |
|---|---|---|---|---|
| 5,188,993 A | | 2/1993 | Takahashi et al. | 501/136 |
| 5,403,796 A | | 4/1995 | Takahashi et al. | 501/336 |
| 5,444,028 A | * | 8/1995 | Takahashi et al. | 501/136 |
| 6,107,228 A | * | 8/2000 | Sugimoto et al. | 501/139 |
| 6,221,799 B1 | * | 4/2001 | Takase et al. | 501/136 |

* cited by examiner

*Primary Examiner*—Karl Group
(74) *Attorney, Agent, or Firm*—Dykema Gossett PLLC

(57) ABSTRACT

A dielectric ceramic composition wherein the dielectric constant ∈ is large, the temperature coefficient τf of the resonance frequency is close to 0, and which as a large Q value, is obtained by adding to and blending with a ceramic composition whose τf of the resonance frequency is large on the plus side a ceramic composition whose temperature coefficient τf is large on the minus side. In an $Li_2O$—$R_2O_3$—$TiO_2$-based composition, an improved dielectric constant ∈ can be achieved by introducing a specific quantity of $Bi_2O_3$, and τf can be shifted to the plus side and in addition a considerable improvement in Qf achieved by introducing a specific quantity of MO, where M is one or two of Ca and Sr. Furthermore, by introducing a specific quantity of $Na_2O$ together with the MO (where M is one or two of CA and Sr), in particular in the case of material of ∈r>150, it is possible to control τf to the vicinity of 0 while maintaining Qf at an high value.

2 Claims, No Drawings

MICROWAVE DIELECTRIC CERAMIC COMPOSITION

TECHNICAL FIELD

The present invention relates to a microwave dielectric ceramic composition employed in resonator materials or capacitor materials etc used in the microwave region of a few GHz.

BACKGROUND ART

Dielectrics are used in the resonators, filters, or capacitors that are used in transceivers for for example satellite communication broadcasting or mobile identification devices using microwaves of a few GHz.

As such dielectric ceramic materials, for example $BaO$—$TiO_2$—$Nd_2O_3$—$Bi_2O_3$ compositions have been proposed (Laid-open Japanese Patent Application No. Sho. 61-8806). The dielectric constant $\in$ of this composition is of the order or 70 to 110; when dielectric resonators or capacitors are constructed, materials of larger dielectric constant $\in$ are preferred since the larger the dielectric constant $\in$ of the material that is used, the smaller are the dimensions of the resonator.

Conventional materials of large dielectric constant $\in$ include for example $SrTiO_3$ and $CaTiO_3$ etc; while their dielectric constant $\in$ is very large at 300 and 180, the temperature coefficient $\tau f$ of the resonance frequency is extremely large at +1700 ppm/°C. and +800 ppm/°C., which means that it is not possible to use them.

Accordingly, as a method of lowering the temperature coefficient $\tau f$ of a dielectric ceramic composition, the method is available of preparing a material whose dielectric constant $\in$ is as large as possible and whose temperature coefficient $\tau f$ has a negative value; with this method, a ceramic composition can be obtained by a suitable composition whose dielectric constant $\in$ is large and whose temperature coefficient $\tau f$ of resonance frequency is small.

For example, Laid-open Japanese Patent Publication No. H. 5-211009 proposes the obtaining of a ceramic composition of large dielectric constant $\in$ and whose temperature coefficient of resonance frequency $\tau f$ is close to zero, by preparing a material represented by the compositional formula $(A^{1+}_{1/2} \cdot B^{3+}_{1/2}) TiO_3$ where $A^{1+}$ is $Li^{1+}$, and $B^{3+}$ is $Nd^{3+}$, $Sm^{3+}$, $Co^{3+}$ or $Pr^{3+}$, constituting a material of large dielectric constant $\in$ and wherein the temperature coefficient $\tau f$ has a negative value.

However, the demands for miniaturization of portable electronic terminal equipment have today become so exacting that a material having even higher dielectric constant $\in$ is earnestly sought for the dielectric material of resonators, filters and capacitors employed in such devices.

DISCLOSURE OF THE INVENTION

In view of the characteristics required for a dielectric ceramic composition for microwaves, an object of the present invention is to obtain a dielectric ceramic composition wherein the dielectric constant $\in$ is large, the temperature coefficient $\tau f$ of the resonance frequency is close to 0, and which has a large Q value, by adding to and blending with a ceramic composition whose $\tau f$ of the resonance frequency is large on the plus side to a ceramic composition whose temperature coefficient $\tau f$ is large on the minus side.

With the object of providing a dielectric ceramic composition whose dielectric constant $\in$ is large, whose temperature coefficient of resonance frequency $\tau f$ is close to 0, and whose Q value is large, the present inventors have previously proposed a dielectric ceramic composition represented by the compositional formula $Li_2O$—$Na_2O$—$Bi_2O_3$—$R_2O_3$—$TiO_2$, where $R_2O_3$ is one or two or more of $La_2O_3$, $Nd_2O_3$, $Sm_2O_3$, $Co_2O_3$ or $Pr_2O_3$ (Japanese Patent Application Number 2000-337141).

Also, the present inventors have proposed (Japanese Patent Application Number 2000-340104) a dielectric ceramic composition represented by the compositional formula $Li_2O$—$Bi_2O_3$—$R_2O_3$—$SrTiO_3$, where $R_2O_3$ is one or two or more of $La_2O_3$, $Nd_2O_3$, $Sm_2O_3$, $Co_2O_3$ or $Pr_2O_3$.

As a result of further assiduous investigation, the present inventors discovered that an excellent dielectric characteristic could be obtained in stable fashion by co-presence of specific quantities of $Bi_2O_3$, $Na_2O$ and MO (where M is one or two of Ca and Sr) in the one or two or more of La, Nd, Pr and Sm constituting R, in the $Li_2O$—$R_2O_3$—$TiO_2$-based composition.

Specifically, the present inventors discovered that, in an $Li_2O$—$R_2O_3$—$TiO_2$-based composition, an improved dielectric constant $\in$ could be achieved by introducing a specific quantity of $Bi_2O_3$, and $\tau f$ could be shifted to the plus side and in addition the effect of a considerable improvement in Qf achieved by introducing a specific quantity of MO (where M is one or two of Ca and Sr).

They discovered that, by introducing MO, $\tau f$ becomes too large, making it difficult to make $\tau f$ approach 0 while maintaining Qf at a fixed value, so, by introducing a specific quantity of $Na_2O$ together with the MO (where M is one or two of Ca and Sr), in particular in the case of material of $\in r>150$, it was possible to control $\tau f$ to the vicinity of 0 while maintaining Qf at an high value, and thereby perfected the present invention.

Specifically, the present invention consists in a microwave dielectric ceramic composition represented by the compositional formula

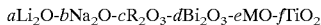

$$aLi_2O\text{-}bNa_2O\text{-}cR_2O_3\text{-}dBi_2O_3\text{-}eMO\text{-}fTiO_2$$

(where $a+b+c+d+e+f=100$, a, b, c, d, e and f being mol %) where R includes one or two or more of Nd, Sm, Pr, and La, M includes one or two of Ca and Sr and a, b, c, d, e, f satisfy $5<a<15$, $0<b<10$, $3<c<15$, $1<d<15$, $1<e<30$, and $40<f<75$.

BEST MODE FOR CARRYING OUT THE INVENTION

In the present invention, in the $Li_2O$—$Na_2O$—$R_2O_3$—$Bi_2O_3$—$MO$—$TiO_2$-based composition (where R is one or two or more of Nd, Sm, Pr, and La and M is one or two of Ca and Sr), if $Li_2O$ is less than 5 mol %, the dielectric constant is low and $\tau f$ becomes too large on the plus side; while if it exceeds 15 mol %, $Li_2O$ being of low melting-point, this is undesirable because there is the problem that the ceramic composition reacts and fuses with the base plate or base powder during sintering. A range of $5<a<15$ mol % is therefore specified for $Li_2O$ (a).

Also, if $Na_2O$ exceeds 10 mol %, this is undesirable because it gives rise to the problem that $\tau f$ becomes too large on the plus side, and Qf falls. Accordingly, a range of $0<b<10$ mol % is specified for $Na_2O$ (b).

If $R_2O_3$ ($R^{3+}$ is one or two or more of $Nd^{3+}$, $Sm^{3+}$, $Pr^{3+}$, and $La^{3+}$) is less than 3 mol %, the dielectric constant is low and Q is also poor; if it exceeds 15 mol %, there is little benefit and costs are increased, which is undesirable. A range of $3<c<15$ mol % is therefore specified for $R_2O_3$ (c).

$Bi_2O_3$ has the effect of increasing the dielectric constant $\in$ and a content thereof of at least 1 mol % is necessary; however, because of its lower melting-point, if it exceeds 15 mol %, there is a risk that the ceramic composition will react and fuse with the base plate or base powder on sintering; this is therefore undesirable. Accordingly, a range of 1<d<15 mol % is specified for $Bi_2O_3$ (d).

Also, the content of MO (where M is one or two of Ca and Sr) has the benefit of improving Qf and improving the temperature coefficient τf; however, if it is less than 1 mol %, there is little benefit in terms of improving Qf and improving the temperature coefficient τf and if it exceeds 30 mol %, the temperature coefficient τf becomes too large on the plus side, which is undesirable. Accordingly, a range of 1<e<30 mol % is specified for MO (e).

In addition, if $TiO_2$ is less than 40 mol %, the required crystalline phase is not obtained and the required dielectric characteristic is not obtained; if it is more than 75 mol %, the problem arises that a phase consisting of $TiO_2$ on its own appears, severely lowering Qf, which is undesirable. A range of 40<f<75 mol % is therefore specified for $TiO_2$ (f).

EXAMPLE

High-purity $TiO_2$, $Bi_2O_3$, $Li_2CO_3$, $Nd_2O_3$, $Sm_2O_3$, $Pr_6O_{11}$, $La_2O_3$, $Na_2CO_3$, $CaCO_3$, and $SrCO_3$ were weighed out and blended such that the required mol percentages were obtained in the raw material, as in Table 1 to Table 2, so as to obtain a mixture of compositional formula $aLi_2O$-$bNa_2O$-$cR_2O_3$-$dBi_2O_3$-$eMO$-$fTiO_2$ (where a+b+c+d+e+f=100, a, b, c, d, e and f being mol %, R includes one or two or more of Nd, Sm, Pr, and La, M includes one or two of Ca and Sr); mixing was performed for 5 to 20 hours using a ball mill.

After mixing, calcining was performed for one hour to five hours at 700° C. to 1000° C. After this, the mixture was again pulverized for 2 to 50 hours, and the pulverized powder was mixed with organic binder and pelletized, then sieved and molded into the shape of a disc of diameter 10 mm, thickness 6 mm with a pressure of 2 to 3 T/cm². This molding was then sintered for one to five hours at 1200° C. to 1400° C., and both faces thereof polished so that the thickness of the sintered body was half its diameter, thereby producing a measurement sample.

The dielectric constant $\in$, Q value and temperature coefficient τf of resonance frequency of the measurement samples obtained were measured at a measurement frequency of 3 GHz, using the method of Hakki and Coleman. The measurement results for the dielectric characteristic of the measurement samples are shown in Table 3.

TABLE 1

|    | $Li_2O$ (a) | $Na_2O$ (b) | $R_2O_3$ (R = Na,Sm,Pr,La) (c) |       |
|----|-------------|-------------|--------------------------------|-------|
| 1  | 9.50        | 3.97        | $Sm^{3+}$                      | 8.77  |
| 2  | 10.58       | 4.31        |                                | 9.03  |
| 3  | 10.00       | 5.02        |                                | 9.57  |
| 4  | 9.70        | 5.56        |                                | 9.98  |
| 5  | 10.50       | 0.38        | $Nd^{3+}$                      | 7.97  |
| 6  | 10.75       | 0.69        |                                | 8.24  |
| 7  | 9.80        | 0.93        |                                | 8.44  |
| 8  | 10.70       | 1.24        |                                | 8.72  |
| 9  | 8.00        | 4.01        | $Pr^{3+}$ 0.5 + $Nd^{3+}$ 0.5  | 5.86  |
| 10 | 9.40        | 4.35        |                                | 6.06  |
| 11 | 7.00        | 5.03        |                                | 6.45  |
| 12 | 8.00        | 5.38        |                                | 6.65  |
| 13 | 9.00        | 0.30        | $Pr^{3+}$                      | 6.60  |
| 14 | 9.00        | 0.60        |                                | 6.86  |
| 15 | 7.00        | 0.90        |                                | 7.11  |
| 16 | 7.00        | 1.20        |                                | 7.37  |
| 17 | 8.00        | 4.14        | $La^{3+}$ 0.5 + $Nd^{3+}$ 0.5  | 6.85  |
| 18 | 9.00        | 4.49        |                                | 7.05  |
| 19 | 9.50        | 5.19        |                                | 7.47  |
| 20 | 7.00        | 5.56        |                                | 7.68  |
| 1  | 10.50       | 0           | $Nd^{3+}$                      | 7.64  |
| 2  | 9.00        | 0           | $Pr^{3+}$                      | 6.35  |
| 3  | 8.82        | 0           | $La^{3+}$                      | 4.41  |
| 4  | 9.50        | 4.14        | $Sm^{3+}$                      | 13.69 |
| 5  | 10.50       | 0.30        | $Nd^{3+}$                      | 10.98 |
| 6  | 9.00        | 0.30        | $Pr^{3+}$                      | 9.17  |
| 7  | 8.00        | 8.33        | $Pr^{3+}$ 0.5 + $Nd^{3+}$ 0.5  | 8.33  |
| 8  | 9.00        | 6.67        | $Pr^{3+}$                      | 12.00 |
| 9  | 8.00        | 6.67        | $La^{3+}$ 0.5 + $Nd^{3+}$ 0.5  | 8.33  |

TABLE 2

|    | $Bi_2O_3$ (d) | MO CaO(e) | MO SrO(e) | $TiO_2$ (f) |
|----|---------------|-----------|-----------|-------------|
| 1  | 4.72          | 0.00      | 9.52      | 63.52       |
| 2  | 4.86          | 0.00      | 8.31      | 62.90       |
| 3  | 5.15          | 0.00      | 5.83      | 64.43       |
| 4  | 5.38          | 0.00      | 3.92      | 65.46       |
| 5  | 3.10          | 16.79     | 0.00      | 61.26       |
| 6  | 3.20          | 15.67     | 0.00      | 61.44       |
| 7  | 3.28          | 14.81     | 0.00      | 62.73       |
| 8  | 3.39          | 13.66     | 0.00      | 62.28       |
| 9  | 5.86          | 14.81     | 0.00      | 61.44       |
| 10 | 6.06          | 13.66     | 0.00      | 60.48       |
| 11 | 6.45          | 11.32     | 0.00      | 63.75       |
| 12 | 6.65          | 10.13     | 0.00      | 63.20       |
| 13 | 2.57          | 22.49     | 0.00      | 59.05       |
| 14 | 2.67          | 21.43     | 0.00      | 59.45       |
| 15 | 2.77          | 20.36     | 0.00      | 61.86       |
| 16 | 2.87          | 19.28     | 0.00      | 62.28       |
| 17 | 6.85          | 8.92      | 0.00      | 65.25       |
| 18 | 7.05          | 7.69      | 0.00      | 64.72       |
| 19 | 7.47          | 5.19      | 0.00      | 65.18       |
| 20 | 7.68          | 3.92      | 0.00      | 68.16       |
| 1  | 2.97          | 18.18     | 0.00      | 60.71       |
| 2  | 2.47          | 23.53     | 0.00      | 58.85       |
| 3  | 4.41          | 23.53     | 0.00      | 58.82       |
| 4  | 0             | 0.00      | 8.92      | 63.75       |
| 5  | 0             | 17.07     | 0.00      | 61.15       |
| 6  | 0             | 22.49     | 0.00      | 58.05       |
| 7  | 8.33          | 0.00      | 0.00      | 67.00       |
| 8  | 4.67          | 0.00      | 0.00      | 67.67       |
| 9  | 8.33          | 0.00      | 0.00      | 68.67       |

TABLE 3

| | Dielectric characteristic | | |
|----|-----|---------|----------|
|    | εr  | Qf(GHz) | τf(ppm/° C.) |
| 1  | 131 | 3202    | 17       |
| 2  | 133 | 3134    | 8        |
| 3  | 135 | 3198    | −2       |
| 4  | 137 | 3157    | −6       |
| 5  | 151 | 2132    | 10       |
| 6  | 153 | 2107    | 3        |
| 7  | 155 | 2064    | −5       |
| 8  | 157 | 1987    | −12      |
| 9  | 167 | 1767    | 22       |
| 10 | 170 | 1723    | 14       |
| 11 | 173 | 1702    | 0        |
| 12 | 175 | 1678    | −8       |
| 13 | 179 | 1545    | 14       |

TABLE 3-continued

| | Dielectric characteristic | | |
|---|---|---|---|
| | $\epsilon r$ | Qf(GHz) | τf(ppm/° C.) |
| 14 | 182 | 1512 | 2 |
| 15 | 185 | 1448 | -4 |
| 16 | 188 | 1398 | 18 |
| 17 | 198 | 1312 | 23 |
| 18 | 202 | 1280 | 10 |
| 19 | 208 | 1223 | 1 |
| 20 | 217 | 1187 | -5 |
| 1 | 151 | 2209 | 41 |
| 2 | 180 | 1533 | 86 |
| 3 | 205 | 1109 | 143 |
| 4 | 111 | 3256 | 35 |
| 5 | 129 | 2389 | 68 |
| 6 | 142 | 1644 | 123 |
| 7 | 165 | 978 | 4 |
| 8 | 177 | 745 | -5 |
| 9 | 195 | 465 | 2 |

INDUSTRIAL APPLICABILITY

In an $Li_2O$—$R_2O_3$—$TiO_2$-based composition, an improved dielectric constant $\epsilon$ can be achieved by introducing a specific quantity of $Bi_2O_3$, and τf can be shifted to the plus side and in addition the effect of a considerable improvement in Qf achieved by introducing a specific quantity of MO (where M is one or two of Ca and Sr). Furthermore, by introducing a specific quantity of $Na_2O$ together with the MO (where M is one or two of Ca and Sr), in particular in the case of material of $\epsilon r > 150$, it is possible to control τf to the vicinity of 0 while maintaining Qf at an high value.

A dielectric ceramic composition according to the present invention is ideal for the dielectric material of resonators, filters and capacitors used in transceivers for satellite communication broadcasting or mobile identification devices etc that make use of microwaves of a few GHz, since, as is clear from the Practical Examples, its dielectric constant $\epsilon$ is large, its temperature coefficient τf of resonance frequency approaches 0, and a large Q value is obtained therewith.

What is claimed is:

1. A microwave dielectric ceramic composition represented by the compositional formula

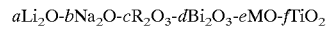

$$a Li_2O\text{-}b Na_2O\text{-}c R_2O_3\text{-}d Bi_2O_3\text{-}e MO\text{-}f TiO_2$$

wherein a+b+c+d+e+f=100, a, b, c, d, e and f being mol %, wherein R is selected from the group consisting of Nd, Sm, Pr, and La, M is selected from the group consisting of Ca and Sr, and a, b, c, d, e and f satisfy:

5<a<15, 0<b<10, 3<c<15,

1<d<15, 1<e<30, 40<f<75.

2. A microwave dielectric ceramic composition according to claim 1, wherein b is at least 0.3.

* * * * *